United States Patent [19]

Kisslig

[11] 3,912,250

[45] Oct. 14, 1975

[54] JIG FOR SETTING WORKPIECES

[75] Inventor: Heinz Kisslig, Felben, Switzerland

[73] Assignee: Utilis Mullheim AG, Mullheim, Switzerland

[22] Filed: Feb. 5, 1974

[21] Appl. No.: 439,930

[30] Foreign Application Priority Data

Feb. 8, 1973   Switzerland.......................... 1785/73

[52] U.S. Cl. ............................................... 269/91
[51] Int. Cl.² ........................................... B23Q 3/06
[58] Field of Search ............. 269/88, 91, 92, 93, 94, 269/321 ME

[56] References Cited
UNITED STATES PATENTS

| 2,577,029 | 12/1951 | Moorehead........................... | 269/94 |
| 2,725,793 | 12/1955 | Gramura............................... | 269/93 |
| 3,194,548 | 7/1965 | Zwick................................... | 269/93 |

Primary Examiner—Roy Lake
Assistant Examiner—Mark S. Bicks
Attorney, Agent, or Firm—Finnegan, Henderson, Farabow & Garrett

[57] ABSTRACT

A jig for setting a workpiece on a table or platen is provided. The jig includes a plurality of stack elements, a tension rod comprising a plurality of rod segments connected together in an end to end relationship and extending axially through openings provided in the stack elements, and a clamping element mounted on the upper end of the tension rod for engaging and holding a workpiece against the table or platen. Adjacent ends of the rod segments are provided with profiled sections which permit the rod segments to be plugged in transversely to the axis of the tension rod. Various configurations of the profiled sections are disclosed. The profiled sections provide a predetermined amount of axial play between the rod segments to facilitate assembly and disassembly of the rod segments.

11 Claims, 8 Drawing Figures

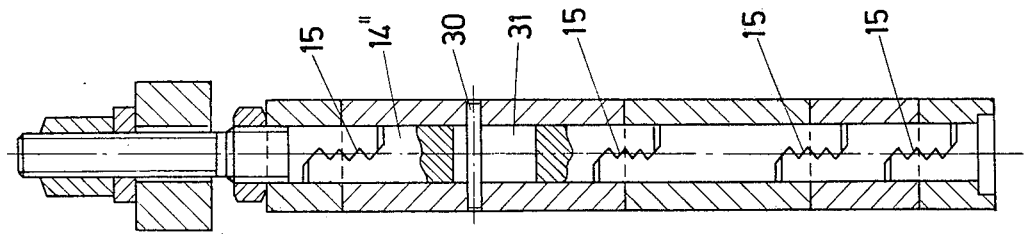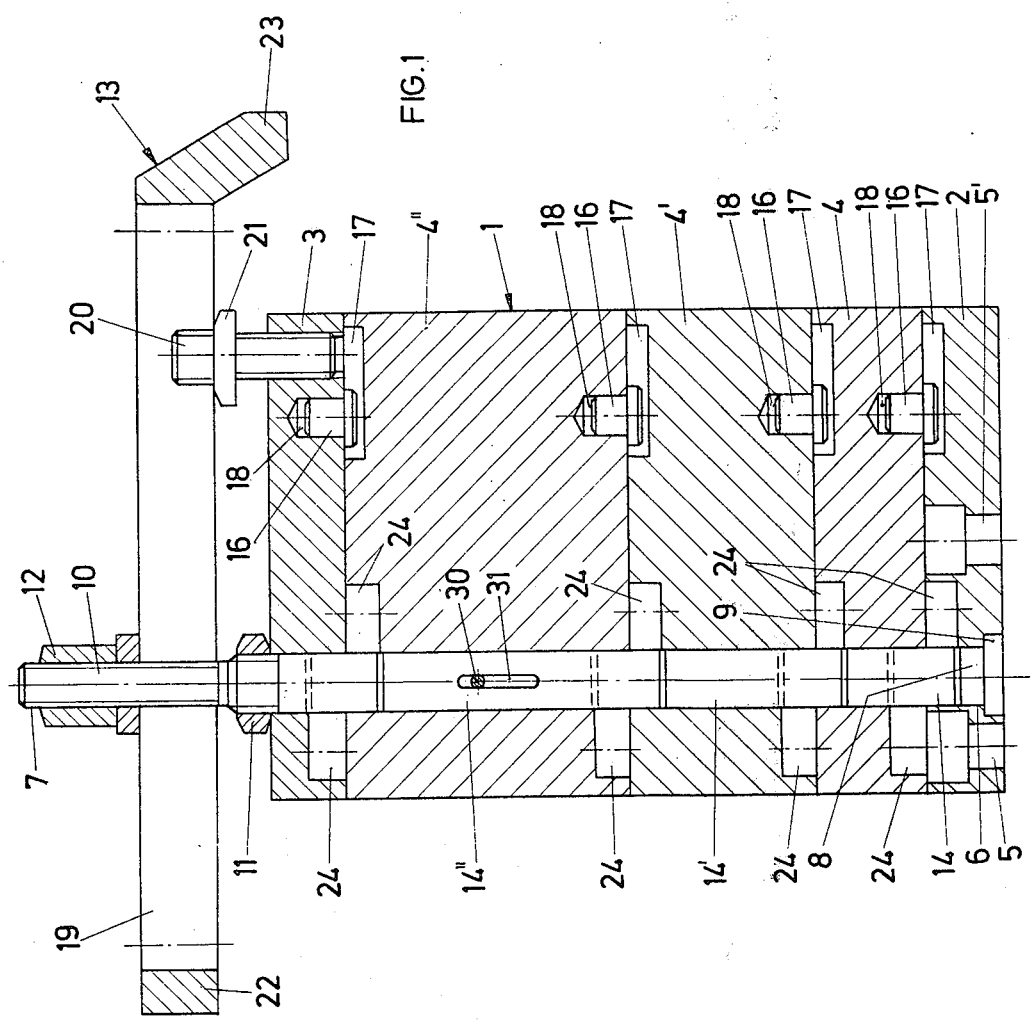

JIG FOR SETTING WORKPIECES

The present invention relates to a jig for setting workpieces and, more particularly, to a jig for setting a workpiece on a platen.

As a rule, machine tools are equipped with tables or platens with tee-slots or dove-tailed grooves for the setting of workpieces. Screw bolts may be introduced into the slots in order to bolt the workpieces directly or indirectly to the table or platen. Additional clamping members are required, with intermediate shims, e.g., in the form of stepped supports, being inserted between the members and the table or platen, so that the spacing between the clamping element and the table or platen may be adapted to the size of the workpiece. Because the individual parts of the known setting devices are not interconnected, they may drop or shift during the setting or dismounting of the workpiece. This appreciably increases the complexity of setting workpieces and requires considerable expenditure in time, especially when several similar workpieces are to be machined consecutively. A further drawback of known setting devices as regards individual elements that can be stacked one upon the other consists in the presence of a clamping through-bolt which must be exchanged for another every time the height of the clamping device changes. On account of this drawback, the bolt frequently will be chosen too long and will protrude too much, hence presenting an obstacle to the machine tool and endangering the operator.

The present invention addresses the task of creating a jig for setting workpieces that consists of individual components that are or may be loosely interconnected so that they will not fall apart during setting or dismantling, or be subject to being toppled over. The invention solves this problem in that the tension rod consists of several segments which may be plugged-in transversely to the axis of the tension rod and in that each segment is mounted in a corresponding stacking element, and in that a given amount of axial play is provided at least for those segments which are intermediate ones. In this manner, one obtains a jig which on the one hand will be a compact unit as regards changing similar workpieces on the machine tool and on the other hand may be swiftly shortened or lengthened without having to exchange each time the clamping bolt or without the clamping bolt projecting excessively above the jig.

The anchoring of the jig in the table or in the platen may be achieved either by appropriately designing the lowest tension rod segment, e.g., by allowing the foot of the tension rod to be inserted into the slots of the table or of the platen, or one of several bores may be provided in the base element through which will pass suitable mounting bolts. It is furthermore possible to mount an eccentric setting element in the base element, by means of which the previously assembled jig may be mounted as a single unit at the desired location in the table or platen. An adjustable compression bolt is appropriately provided in the top element of the stacked set, which, together with a tightening nut on the tension rod will effect the clamping action of the jig.

On account of the tension rod holding the stacked elements together during setting or dismantling, the jig will allow machining without collapsing into its individual parts. This is of special advantage for horizontally directed setting. Not only will the setting labor be appreciably shortened, but also the jig may be used over again without having reset when mass-production is involved. Using intermediate elements of different heights and a slanted clamping element furthermore allows effortless and simple adaptation of the jig to the most varied heights of workpieces. The intermediate elements also may be put together in varying sequence.

Preferred embodiments of the invention are discussed in greater detail below in relation to the drawings, in which:

FIG. 1 is a vertical, lengthwise section of an embodiment of the jig constructed according to the principles of the present invention;

FIG. 2 is a vertical cross-section along the tension rod of the embodiment of FIG. 1;

Figures 3, 4, 5, 6:
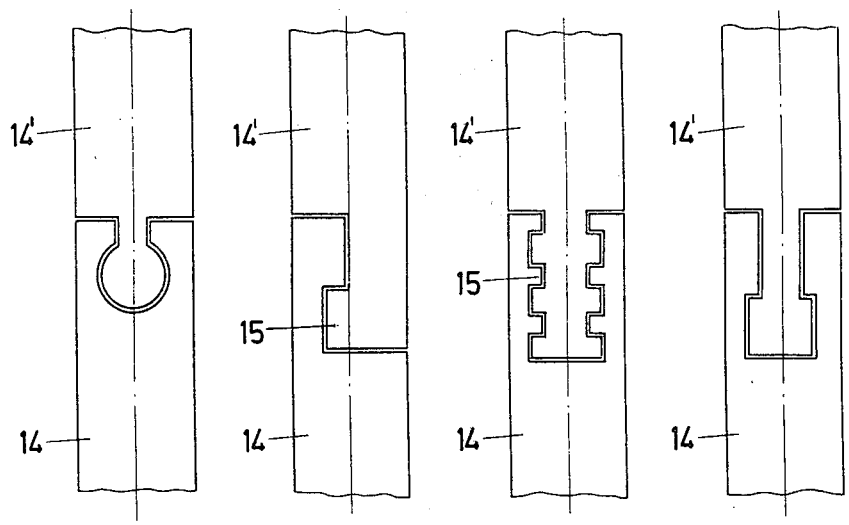
FIGS. 3–6 are examples of various profiles of the tension rod segments.

As shown by FIGS. 1 and 2, a stacked set 1 consists of a base element 2, a top element 3 and three intermediate elements 4, 4', 4'' of varying heights. The base element 2 is designed with two recessed bores 5, 5' for seating anchor bolts by means of which the jig may be fastened to the table or platen. An eccentric setting element mounted in the base element 2 provides a means by which the previously assembled jig may be mounted as a single unit at the desired location on the table or platen. A third bore 6, which is also recessed, serves to seat a multi-part tension rod 7 of which the lowermost segment 8 is provided with a shoulder 9. The uppermost rod segment 10 is provided with two threads, the larger one holding a pre-clamping nut 11 bolting the stacked set, the smaller one holding a tightening nut 12 for fastening a clamping element 13. Intermediate rod segments 14, 14' and 14'' are provided between end segments 8 and 10 of the tension rod, the intermediate segments lending themselves to be plugged in interchangeably and also in lieu of the end segments on account of profile design 15 (FIG. 2). Tension rod segments 8, 10, 14, 14', 14'' are connected to the corresponding stack elements 2, 3, 4, 4', 4'' so as to be mutually axially movable. Further, assembly slots 24 are provided in all the stack elements, wherein the ends of the tension rod segments 8, 10, 14, 14' and 14'' provided with profiles may move freely when the stack elements are sliding into each other. The assembly slots 24 are located in alignment with the profile sections of a corresponding pair of rod segments to permit the rod segments to be shifted laterally relative to each other in the assembly and disassembly of the rod segments.

Profiles 15 are so selected that on one hand the axial forces acting on tension rod 7 will be flawlessly transmitted and on the other hand the individual segments of tension rod 7 may be easily and simply plugged together with the intermediate stack elements transversely to the axis of the tension rod and may be pulled apart with the same readiness. The plug-in direction is parallel to the plane of the drawing of FIG. 1, and vertical to that of FIG. 2. A first example of such a profile design 15 is the saw-tooth of FIG. 2. FIG. 3 through 6 show further embodiments; FIG. 3 shows a round profile, FIG. 4 a talon profile, FIG. 5 a thread or step profile, and FIG. 6 a T-profile. The profiles of FIGS. 4, 5 and 6 are particularly favorable with respect to optimum transmission of tensional forces in the axial direction of the tension rod.

A further advantage of the profile design of FIG. 5 consists in the latitude of selecting the steps in various widths, so that the profile parts may be shifted into one another without there being possibility of confusion. As a result, every step rather than only some of the steps will transmit the axial forces that do occur. Hence, overloading of profile under strong tension rod 7 stresses will be avoided.

Axial displacement between tension rod segments 8, 10, 14, 14', 14'' and the corresponding stack elements 2, 3, 4, 4', 4'' may be achieved by means of a bolt 30 as shown in FIG. 2. The bolt is mounted in the stack elements, as illustrated for element 4'' and passing through a slotted hole 31 in the corresponding tension rod segment 14''. The bolt thereby connects the rod segments to its corresponding stack elements.

A plurality of connecting pins 16 provide another connection point for the stack elements. The connecting pins each include a head which penetrates into a groove 17 of the lower adjacent stack element and a shank which extends into a bore 18 of the upper adjacent stack element. In this manner, the connecting pins will on one hand lock the relative positions of the stack elements in addition to the locking obtained from the tension rod, and on the other hand, because of groove 17, the pins will allow the required reciprocal lengthwise shifting needed for assembly.

Figure 7:
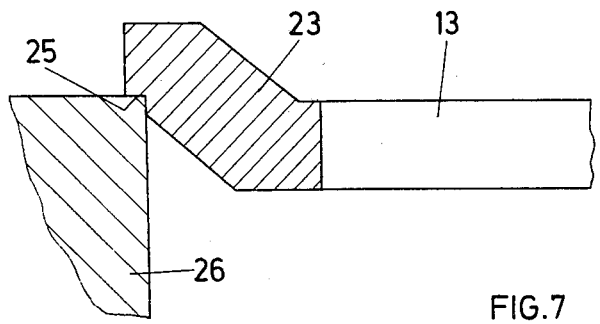
FIG. 7 is a further example of a clamping element for the jig.

Clamping element 13 is provided with a longitudinal slit 19 extending almost over its entire length, which allows passage of tension rod 7 on one hand, and of a pressure bolt 20 on the other. Pressure bolt 20 is threaded into top stack element 3 and a nut 21 on which rests clamping element 13 is threaded on the pressure bolt. As shown in the embodiment of FIG. 1, the left flat end 22 of the clamping element 13 constitutes the compression point by means of which a workpiece may be set. However, the clamping element 13 also may be rotated by 180° so that, alternatively, its slanted ends 23 may engage the workpiece. As shown in FIG. 7, the slanted end may be inclined upwardly and may also be provided with one or more steps 25 to allow setting of a workpiece 26 without tension rod 7 and clamping nut 12 projecting upward above the clamping element. The different design of the two ends of clamping element 13 allows better fitting of the jig to various intermediate sizes or shapes of the workpieces being set.

Figure 8:
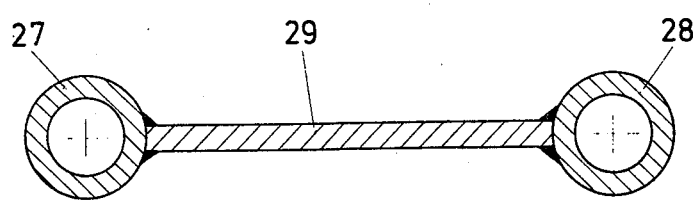
FIG. 8 is a cross-section of an intermediate element of FIG. 1.

As shown in FIG. 8, base element 2, top element 3 and intermediate elements 4, 4' and 4'' preferably consist of two shaped sections or tubes 27 and 28 welded to flat middle bar 29. On that account, there is a specially favorable force transmission as regards those elements to the extent that the shaped section parts are subject to pure pressure loading and the middle parts will transmit shear forces to the shaped sections or tubes. Reciprocal torsioning is virtually excluded. This design further allows mounting the jig solely in the region of tension rod 7 on the table or platen; that end of the jig which is far from the tension rod may project beyond the table or platen. Nevertheless, all the forces that do occur will be flawlessly transmitted as compression forces to the mounting location at the table or platen.

The invention in its broader aspects is not limited to the specific details shown and described, and modifications may be made in the details of the disclosed embodiments without departing from the principles of the present invention.

What is claimed is:

1. A jig for setting a workpiece on a platen, comprising:
 a plurality of stack elements each including an opening extending therethrough located in alignment with the corresponding openings in the other stack elements upon arrangement of said elements in a stack;
 a tension rod extending axially through said openings in said stack elements and including a lower end disposed to be attached to the lowermost of said stack elements and an upper end extending above said stack of elements;
 said tension rod comprising a plurality of rod segments, each of them being connected to a corresponding stack element providing a predetermined axial play, each rod segment further being provided with connecting means for joining said rod segments in an end-to-end relationship, said rod segments together with said corresponding stack elements being laterally slidable relative to each other to engage and disengage said connecting means in the assembly and disassembly of said rod segments;
 locking means for locking each adjacent pair of stack elements together to prevent relative rotation between said pair of stack elements about said tension rod; and
 a clamping element mounted on said upper end of said tension rod for engaging and holding a workpiece against the platen.

2. The jig of claim 1, wherein said connecting means comprises:
 at least one profiled section formed at one end of each rod segment for engaging a corresponding profiled section on the adjacent end of another rod segment to transmit tensional forces axially along said rod segments.

3. The jig of claim 2, wherein:
 each adjacent pair of stack elements is provided with assembly slots extending laterally from the respective openings in opposite directions relative to said tension rod, said assembly slots being located in alignment with the profiled sections of a corresponding pair of rod segments to permit said rod segments to be shifted laterally relative to each other in the assembly and disassembly of said rod segments.

4. The jig of claim 1, wherein the lowermost of said stack elements is provided with a counterbore at the lower end of its opening and the lowermost rod segment is provided with a shoulder received in said counterbore to anchor said lowermost rod segment in said lowermost stack element and fastening means for securing said lowermost stack element to the platen.

5. The jig of claim 4, wherein said lowermost stack element is provided with a plurality of bores, and said fastening means comprises a plurality of anchor screws received in said bores for securing lowermost stack element to the platen.

6. The jig of claim 1, wherein said locking means comprises a groove formed in one of the stack elements and a pin secured to the other stack element and received in said groove.

7. The jig of claim 1, wherein said clamping element includes an elongated slot for receiving the upper end of said tension rod to slidably support said clamping element for movement relative to said tension rod.

8. The jig of claim 7, wherein said clamping element comprises an elongated arm having one end thereof slanted relative to said arm.

9. The jig of claim 8, wherein said slanted end is inclined upwardly relative to said arm and provided with at least one step-like offset for engaging the workpiece without the upper end of said tension rod protruding over the upper edge of said clamping element.

10. The jig of claim 1, wherein each stack element consists of a pair of spaced parallel tubes interconnected by a web extending between the tubes.

11. The jig of claim 2, wherein the profiled section of said one end of the adjacent rod segments comprises an extension having a step-like cross section consisting of a plurality of steps of various widths and the profiled section of the other adjacent end of the rod segments comprises a recess having a step-like cross section which mates with said extension to join said rod segments together for transmission of axial forces.

* * * * *